United States Patent [19]

Delfosse

[11] 4,177,891
[45] Dec. 11, 1979

[54] CONVEYOR BELT DEFORMABLE IN SPACE

[75] Inventor: Gilbert Delfosse, Avrille, France

[73] Assignee: Braud, Société Anonyme, Angers, France

[21] Appl. No.: 930,401

[22] Filed: Aug. 2, 1978

[30] Foreign Application Priority Data

Aug. 12, 1977 [FR] France ................. 77 24846

[51] Int. Cl.² .............. B65G 17/36; A01D 61/00
[52] U.S. Cl. .................................. 198/570; 56/330;
198/712; 198/713
[58] Field of Search ............ 198/307, 570, 626, 701,
198/702, 707, 708, 711, 712, 713, 714; 56/330

[56] References Cited

U.S. PATENT DOCUMENTS 3,601,965  8/1971  Kaessbohrer et al. ............. 56/330
3,603,447  9/1971  Pott .................................... 198/711

Primary Examiner—Jeffrey V. Nase

[57] ABSTRACT

In this assembly of conveyor elements each element is corrugated to comprise a regular series of alternating hollow portions and projecting portions to constitute bucket-like elements having each at one end a bellows structure and at the other end a plain end wall preferably higher in the center of the hollow portions than near the projecting portion; a transverse lip may be formed integrally on one side of the projecting portion, and the bottom of each element is secured to a link of a longitudinally non-extensive drive member, for instance a chain, the assembly of elements being adapted to undergo a certain deformation not only in directions at right angles to the longitudinal direction but also in any other direction. Two adjacent assemblies of elements may be imbricated with each other along their edges formed with plain end walls for clearing possible obstacles engaged therebetween.

4 Claims, 8 Drawing Figures

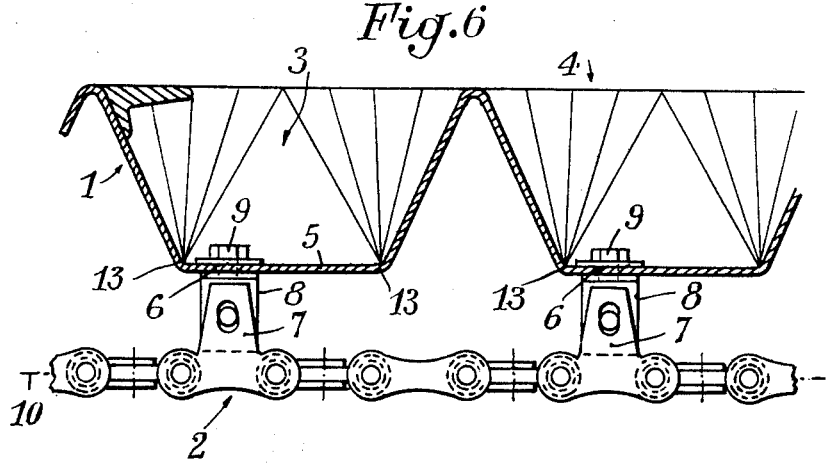
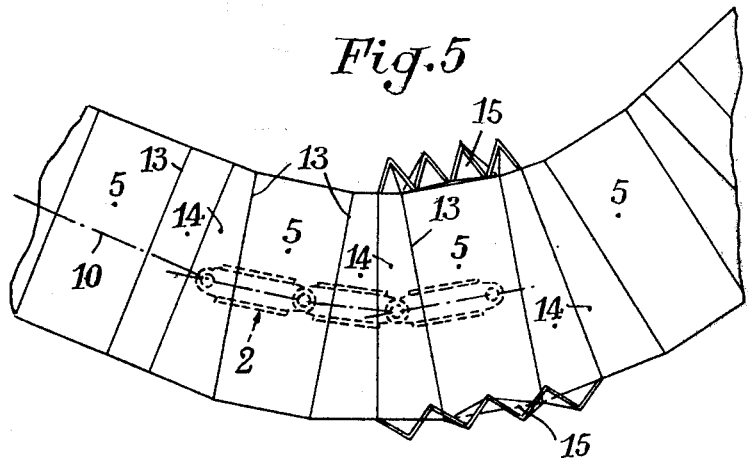
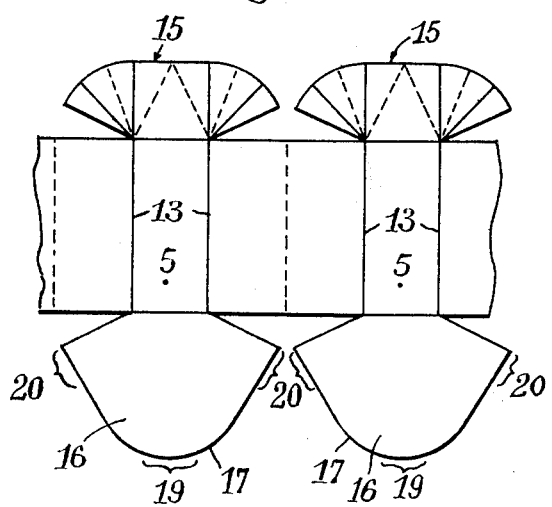
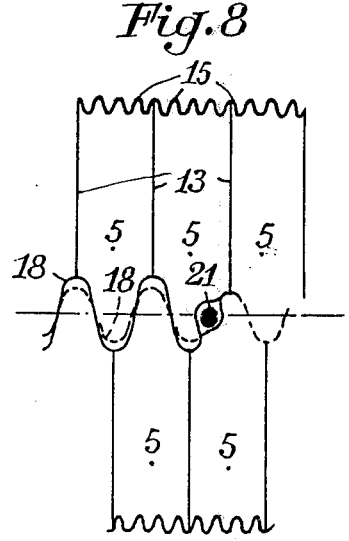

CONVEYOR BELT DEFORMABLE IN SPACE

FIELD OF THE INVENTION

The present invention relates to a conveyor element for a material to be transported, this element being of the type adapted to be driven by a longitudinally non-extensible traction member adapted to be put out of shape in any direction at right angles to its length, in order to cause the material to be transported along a path having radii of curvature disposed in two planes perpendicular to each other.

Such longitudinally non-extensible traction members adapted to be put out of shape in any direction at right angles to their length are well knwon, notably in the form of chains. However, the construction of an automatic conveyor capable of progressing in any manner in space is attended by many technical difficulties in connection with the making of the conveying element. These difficulties increase in proportion with the stress and load applied to the conveyor, and more particularly it appears that the problem of transporting automatically along a path having radii of curvature in two perpendicular planes, a material loaded intermittently or continuously on the conveyor has not been solved very satisfactorily up to now, i.e. without any at least partial loss of material during the loading step or without the risk of impairing the integrity of this material.

SUMMARY OF THE INVENTION

It is the essential object of the present invention to solve this problem by providing a conveyor element specially intended for an automatic conveyor of the universal or total deflection type.

This conveyor element is characterized essentially in that it comprises a flaxible corrugated or folded band or belt forming a series af regularly alternating hollow portions and projecting portions, the bottom of the hollow portions being fastened at spaced intervals to the traction member.

BRIEF DESCRIPTION OF THE DRAWINGS

In order to afford a clearer understanding of this invention, reference will now be made to the accompanying drawing illustrating diagrammatically by way of example typical forms of embodiment of the conveyor belt element according to the present invention, given by way of illustration, not of limitation.

In the drawing:

FIG. 5 is a plane view from above showing on a reduced scale the conveyor element of FIG. 4;

FIG. 6 is a fragmentary longitudinal section showing on a larger scale a conveyor element according to this invention;

FIG. 7 is a plane view from above of the conveyor element of FIG. 4, and

FIG. 8 is a plane view from above showing two conveyor elements similar to the one illustrated in FIG. 4.

DETAILED DESCRIPTION OF THE INVENTION

Figure 1:
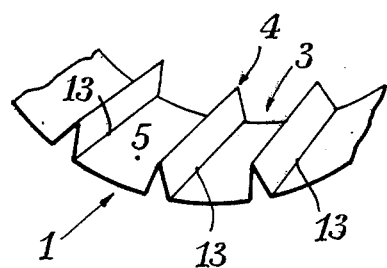
FIG. 1 is a diagrammatic perspective view of a conveyor element according to an elementary form of embodiment of the invention, which is caused to follow a path having a radius of curvature perpendicular to its plane and a concavity facing upwards.

The present invention is directed to provide a conveyor element or band 1, adapted to be driven by a traction member 2 (FIG. 6) for automatically transporting material along a predetermined path, the latter comprising curved sections having radii of curvature disposed in two perpendicular planes.

For this purpose, the longitudinally non-extensible traction member 2 may be of any type known per se and adapted to be put out of shape or alignment in any direction perpendicular to its length, and the conveyor element 1 consists essentially of a flexible corrugated or folded band forming a series of regularly alternating hollow portions 3 and projecting portions 4, the hollow portions 3 having their bottoms 5 fastened to the traction member 2 at spaced intervals 6. This conveyor is tight under overhead filling or loading conditions since the band is a continuous one.

The traction member 2 may also consists of a cable, rope or belt, or any other flexible, non-extensible element; however, if a chain, notably a chain of the so-called "universal" or total deflection type as shown in FIG. 6 is used, the strength and precision of the traction element drive is greatly improved.

In this case, the pitch of the series of hollow portions 3 and projecting portions 4 of band 1 is multiple of the pitch of the drive chain 2, and the coupling between the conveyor element band 1 and the chain 2 is obtained by using a special chain link 7 pivoted to an angle member 8 secured in turn to the bottom 5 of the corresponding hollow portion 3 by means of screws, bolts or rivets 9.

The traction member 2 may also comprise timing means (not shown) such as chain rollers, lugs rigid with a rope, cogged or toothed belt, etc. . . . for synchronizing the movement of the conveyor with another function.

A clearly shown in FIG. 6, the longitudinal section of the hollow portions 3 is preferably of trapezoidal configuration and the section of the projecting portions 4 is triangular.

Since the drive chain 2 is non-extensible in its longitudinal direction, it constitutes the neutral fibre of the conveyor comprising this chain 2 and the belt or band 1.

Figure 2:
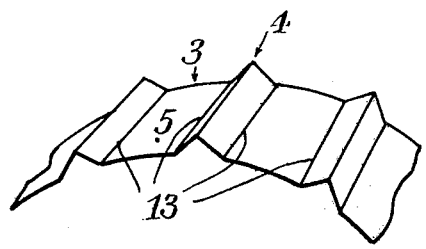
FIG. 2 is a diagrammatic perspective view showing the same conveyor element as in FIG. 1 but lead along a path having a radius of curvature perpendicular to its plane and a downwardly directed concavity.
Figure 3:
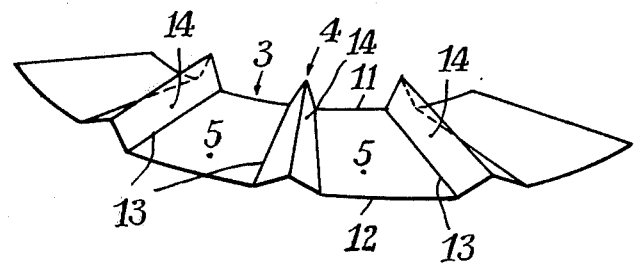
FIG. 3 is a diagrammatic perspective view of the conveyor element of FIGS. 1 and 2, but caused to follow a path having a radius of curvature lying in its plane.

Now, since the bottoms 5 of the hollow portions 3 are remote from the longitudinal axis 10 of the chain the variations in the direction of the path followed by the band produce either a longitudinal compression of this band in relation to the chain (FIG. 1) or an extension of the band (FIG. 2) according to the direction of the concavity of the curve followed by the band, with a radius of curvature perpendicular to the bottoms 5. On the other hand, in the case illustrated in FIG. 3, in which the distance from the bottoms 5 and the chain 2 does not produce any effect, since the bottoms 5 remains in a same plane, a compression of the band 1 in the vicinity of its inner edge 11 and an expansion in the vicinity of its outer edge 12 take place, due to the difference in lengths of the paths followed by these edges, respectively.

In any case, it will be seen that the band deformation is absorbed primarily by the projecting portions 4, the hollow portions remaining substantially unchanged.

In fact, a compression of band 1 (FIG. 1) produces essentially a movement of the fold lines 13 defining the bottoms 5 of a pair of adjacent hollow portions, and an expansion is attended by a movement of said fold lines 13 away from each other (FIG. 2); besides, a deflection of the plane of the band is attended by a convergence of the lines of fold 13 and also by the warping of the surfaces 14 common to the hollow portions 3 and to the projecting portions 4.

If the band 1 is caused to follow a path having simultaneously two radii of curvature in two planes perpendicular to each other, the above-described distorsions are combined with each other without affecting the bottoms 5.

Therefore, each flat bottom 5 of the material transporting cups is substantially distorsion-free, so that the material contained therein is not impaired in any way.

Bellows 15 or flexible plain end walls or beaks 16 interconnecting the projecting portions 4 along one edge 11 or 12 of the band, or along the two edges thereof, may be provided for closing the ends of the hollow portions 3 so that these portions can be utilized for transporting liquid products or comminuted or particulate materials.

The outer edge 17 of the end walls or beaks 16 constitutes, along the band, a regular undulated or broken line 18 (FIG. 8). In addition, the central portion 19 of these end walls or beaks 16 are preferably higher, in relation to the bottoms 5, than their portions located in the vicinity of the side walls 20. With this particular shape, as illustrated in FIG. 8, it is possible to imbricate the end walls of two bands 1 disposed side by side so that the central portions of the end walls overlap the lateral portions of the end walls of the other band. Thus, a conveyor having twice the width of a single element 1 is obtained while ensuring a perfect tightness under vertical gravity loading conditions in an area having twice the normal width, this arrangement permitting of clearing obstacles such as 21 that are fixed in relation to the band portions by which they are engaged.

This property may advantageously be exploited in the construction of a machine for harvesting in-line agricultural products in which two imbricated endless bands 1 are utilized as shown diagrammatically in FIG. 8, in order to grip each stem 21 of a row of plants to be harvested, to collect the crop directly and then allow this crop to fall by gravity when suitable members of the machine have detached the crop from the plant, and to transfer this crop into the machine for storage purposes; the stem of the plant 21 and the portions of the two bands 1 engaging this stem are held against movement relative to each other for example by causing the bands to move in relation to the machine as in the case of a pair of driving crawler tracks, these bands converging at their lower front portions for clamping the stems 21.

Figure 4:
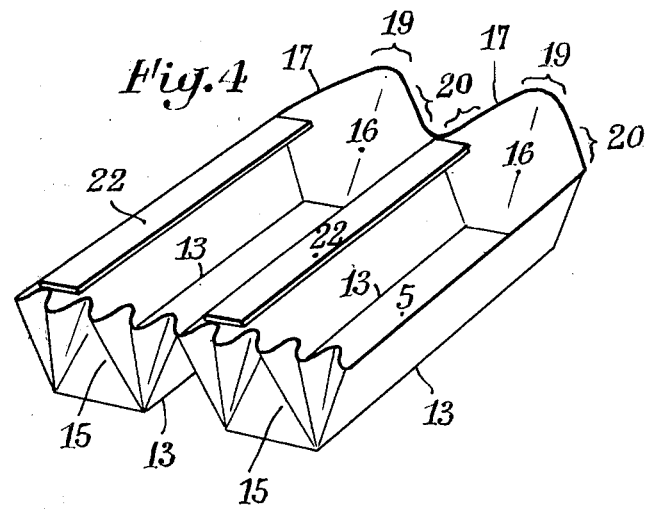
FIG. 4 is a perspective view showing a more complex form of embodiment of the conveyor element according to the present invention.

The band 1 illustrated in FIG. 4 may be obtained by cutting as shown in FIG. 7, the edges of the bellows and of the end walls 16 being subsequently cemented or welded.

Transverse lips 22 may be provided on each projecting portion for permitting the vertical transport or transfer of material. These lips 22 overlie partially the adjacent hollow portions and have all the same orientation. If desired, these lips 22 may be welded to the bellows 15 and/or plain end walls or beaks 16, in order to permit the vertical transport or transfer of liquids or comminuted materials.

The means necessary for guiding the traction member 2 are no part of the present invention and therefore said means have been omitted from the drawing. However, it will readily occur to those conversant with the art that any suitable guide means may be utilized in combination with the present invention.

On the other hand, it will be readily apparent that the forms of embodiment of the invention which are shown and described herein should not be construed as limiting the invention since many modifications and changes may be brought thereto without departing from the basic principles of the invention as set forth in the appended claims. Thus, notably, the band 1 could be made in the form of a series of independent, bucket-shaped cups each connected to the pair of adjacent cups by means of its projecting portion 4.

What is claimed is:

1. An assembly of conveying elements comprising two adjacent and synchronized bands each having a first end wall imbricated in those of the other band so as to constitute a double width conveyor capable of clearing obstacles inserted between the two bands; said bands being flexible and corrugated to form therein a series of alternating hollow portions and projecting portions, each of said bands being secured at spaced intervals to a longitudinally non-extensible traction member capable of being put out of shape in at least one direction perpendicular to its length, wherein the hollow portions of each band form a series of bucketlike elements which are closed along a first edge of each band by said first end walls, said first end walls having substantially identical dimensions and shape.

2. An assembly as claimed in claim 1, wherein said first end walls have a greater dimension in relation to the bottoms of said hollow portions, in the vicinity of their central portion, than in the vicinity of their lateral portions.

3. An assembly as claimed in claim 2, wherein said projecting portions are connected, along a second edge of said band, to bellows formed integrally with the bottoms of said hollow portions to constitute second end walls of said bucket-like elements, opposite said first end walls.

4. An assembly as claimed in claim 3, wherein each projecting portion is provided with a transverse integral lip partially overlying the adjacent hollow portion, said lips having all the same orientation.

* * * * *